US008483987B2

(12) United States Patent
Terao (10) Patent No.: US 8,483,987 B2
(45) Date of Patent: Jul. 9, 2013

(54) CIRCUIT WITH CONTROL FUNCTION AND TEST METHOD THEREOF

(75) Inventor: Kyozo Terao, Sumoto (JP)

(73) Assignee: Panasonic EV Energy Co., Ltd., Kosai (JP)

( * ) Notice: Subject to any disclaimer, the term of this patent is extended or adjusted under 35 U.S.C. 154(b) by 708 days.

(21) Appl. No.: 12/010,946

(22) Filed: Jan. 31, 2008

(65) Prior Publication Data

US 2008/0211532 A1  Sep. 4, 2008

(30) Foreign Application Priority Data

Feb. 14, 2007  (JP) ................................ 2007-033220

(51) Int. Cl.
*G01R 27/28* (2006.01)
*G01R 31/00* (2006.01)
*G01R 31/14* (2006.01)

(52) U.S. Cl.
USPC ................ 702/117; 702/57; 702/58; 702/59; 702/130; 702/183; 702/185

(58) Field of Classification Search
USPC ................ 702/57–59, 79, 117–118, 130, 32, 702/182–183, 185; 324/512, 535, 537, 555, 324/763–765
See application file for complete search history.

(56) References Cited

U.S. PATENT DOCUMENTS 5,038,268 A * 8/1991 Krause et al. .................... 700/16
5,786,568 A * 7/1998 McKinney ..................... 219/400
6,547,435 B1 * 4/2003 Grosswig et al. ............. 374/137
2005/0038614 A1 * 2/2005 Botts et al. ....................... 702/63
2005/0040942 A1 * 2/2005 Johnston ........................ 340/449
2005/0212689 A1 * 9/2005 Randall ..................... 340/870.39
2006/0091877 A1 * 5/2006 Robinson et al. ........... 324/76.11
2006/0259202 A1 * 11/2006 Vaish ............................. 700/295

(Continued)

FOREIGN PATENT DOCUMENTS

JP   A-62-026455   2/1987
JP   A-02-094383   4/1990

(Continued)

OTHER PUBLICATIONS

Thulesius et al., WO2004/066473, Power Management Unit for Portable Electronic Equipment, Aug. 5, 2004, WIPO, pp. 1-34.*

(Continued)

*Primary Examiner* — Alexander H Taningco
*Assistant Examiner* — Yaritza H Perez Bermudez
(74) *Attorney, Agent, or Firm* — Oliff & Berridge, PLC (57) ABSTRACT

There is provided a circuit with control function including a circuit to be controlled so as to be operated only if a predetermined environment meets a specific condition and being arranged to detect, in any predetermined environment, whether or not the circuit with control function is normally operated, and a test method thereof. The circuit with control function includes a controller (microcomputer) for operating the circuit to be controlled (a heater) only if a predetermined environment (ambient temperature) detected by a sensor (a first temperature sensor) meets a specific condition (0° or below). The controller includes a self-diagnosis device for diagnosing whether or not the circuit with control function is normally operated (step S5) and an interruption detecting device (steps S1 to S4) for detecting whether or not energization from a commercial power supply is intermittently interrupted in a predetermined pattern and activating the self-diagnosis device when the interruption of the predetermined pattern is detected.

10 Claims, 6 Drawing Sheets

U.S. PATENT DOCUMENTS

| | | | |
|---|---|---|---|
| 2007/0028862 A1* | 2/2007 | Braun et al. | 123/41.1 |
| 2007/0215018 A1* | 9/2007 | Faries et al. | 109/23 |
| 2008/0055077 A1* | 3/2008 | Lane et al. | 340/540 |

FOREIGN PATENT DOCUMENTS

| | | |
|---|---|---|
| JP | A-2003-200822 | 7/2003 |
| JP | A-2003-232253 | 8/2003 |
| JP | A-2004-017818 | 1/2004 |
| JP | A-2005-339980 | 12/2005 |
| JP | A-2006-288150 | 10/2006 |

OTHER PUBLICATIONS

Aug. 17, 2010 Notification of Reason(s) for Refusal issued in Japanese Patent Application No. 2007-033220 (with translation).

* cited by examiner

CIRCUIT WITH CONTROL FUNCTION AND TEST METHOD THEREOF

BACKGROUND OF THE INVENTION

1. Field of the Invention

The present invention relates to a circuit to be controlled, which is energized by a commercial power supply, a circuit with control function including a control means for controlling the circuit to be controlled, and a test method for examining whether or not the circuit with control function is normally operated.

2. Description of Related Art

There have been proposed various types of circuits with control function including a circuit to be controlled (hereinafter, referred to as a "controlled circuit"), which is energized by a commercial power supply and a control means for controlling the controlled circuit (see for example JP62(1987)-26455A and JP2(1990)-94383A).

JP '455 discloses a hot-air heater (corresponding to the circuit with control function) including a heater (corresponding to the controlled circuit) that is operated by a commercial power supply, a safety mechanism for stopping the operation in the event of a failure or trouble, a timer means, a display means, and a memory (corresponding to the control means). In this hot-air heater, the time at which the safety mechanism is activated is stored in the memory and, as the need arises, the display means displays the time of activation of the safety mechanism. Accordingly, the time of activation of the safety mechanism can be obtained even after the safety mechanism starts to operate. In maintenance or repair of the hot-air heater, therefore, an elapsed time from the start of activation of the safety mechanism and an operation period of time can be assumed, thereby enabling identification of the cause of failure or trouble.

JP '383 discloses an electric heater (corresponding to the circuit with control function) including a heat generator (corresponding to the controlled circuit) that is energized by a commercial power supply, an abnormality detection circuit for detecting a power supply voltage failure and a contact failure of a power supply switch, and a logic circuit (corresponding to the control means) for determining outputs of the abnormality detection circuit. In the event that a user erroneously connects a power plug to a high-voltage power supply or something is wrong with contacts having an operation switching function such as an operation changeover switch, the electric heater can inform the user of the abnormality in power supply voltage or the contact failure, e.g. adhesion, of the device at the start of energization but prior to the operation of the electric heater. Specifically, when the logic circuit detects any abnormality, an alarm is sounded to inform the user of the abnormality before the start of the operation of the electric heater. In the event of abnormality in power supply voltage, the operation is inhibited without closing the power supply switch. Thus, the abnormal use of the electric heater can be prevented to ensure safe operation thereof.

Meanwhile, another circuit with control function has also been proposed in which a circuit to be controlled (controlled circuit) such as a heater is operated only if a predetermined environment (e.g. ambient temperature) meets a specific condition (e.g. 0° or below). One of concrete examples is a circuit with control function provided with a heater (corresponding to the controlled circuit) which is energized by a commercial power supply to heat a secondary battery used as a power source of an electric vehicle or a hybrid electric vehicle. This circuit with control function is arranged to activate the heater (heating by energization) only under the condition that the ambient temperature is 0° or below for example to solve a problem in the secondary battery that cannot provide good output characteristics due to a decrease in discharge capacity under low-temperature environment (e.g. ambient temperature of 0° or below).

In the case where such circuit with control function is subjected to a completion test in a manufacturing facility or an operation check during actual use by the techniques disclosed in JP '455 and JP '383, a test environment for the circuit with control function has to be set in the specific condition (e.g. ambient temperature of 0° or below) in which the heater (controlled circuit) is caused to operate. This setting would require a larger testing system, leading to an increase in testing cost or cause difficulty in operation checks during actual use.

SUMMARY OF THE INVENTION

The present invention has been made in view of the above circumstances and has an object to provide a circuit with control function in which a circuit to be controlled is operated only if a predetermined environment meets a specific condition, the circuit with control function being arranged to detect, in any predetermined environment, whether or not the circuit itself is normally operated, and a test method of the circuit with control function.

To achieve the above object, the present invention provides a circuit with control function comprising: a circuit to be controlled, the circuit being operated by a commercial power supply; a sensor for detecting a predetermined environment; and a control means or device that is operated by the commercial power supply to control the circuit to be controlled, the control means or device being arranged to operate the circuit to be controlled only if the predetermined environment detected by the sensor meets a specific condition, wherein the control means or device includes: a self-diagnosis means or device for diagnosing whether or not the circuit with control function is normally operated; and an interruption detecting means or device for detecting whether or not energization from the commercial power supply is intermittently interrupted in a predetermined pattern, the interruption detecting means or device being arranged to activate the self-diagnosis means or device when the interruption in the predetermined pattern is detected, irrespective of whether or not the predetermined environment meets the specific condition.

The circuit with control function of the present invention is arranged to operate the circuit to be controlled only if the predetermined environment (e.g. ambient temperature) detected by the sensor meets the specific condition (e.g. 0° or below). This circuit with control function includes the self-diagnosis means or device for diagnosing whether or not the concerned circuit with control function is normally operated. It further includes the interruption detecting means or device for detecting whether or not the energization from the commercial power supply is intermittently interrupted in a predetermined pattern and, when it detects the predetermined pattern of interruption, activating the self-diagnosis means or device irrespective of whether or not the predetermined environment meets the specific condition.

Even though the circuit with control function of the present invention is arranged such that the controlled circuit is operated only if the predetermined environment meets the specific condition, the circuit with control function can diagnose, in any predetermined environment, whether or not the circuit itself is normally operated simply by intermittently interrupting the energization from the commercial power supply in the predetermined pattern. Thus, the need for a larger testing system to keep an environment of a test process (a test location) for the circuit with control function under the specific condition in which the controlled circuit is controlled (e.g. ambient temperature of 0° or below) can be eliminated, leading to a decrease in testing cost.

As a technique of intermittently interrupting the energization from the commercial power supply in a predetermined pattern, for instance, there is a technique of interrupting the energization from the commercial power supply three times within one minute from the start of energization.

The "specific condition" under which the controlled circuit is operated may include an ambient temperature of 0° or below and a humidity of 80% or more.

The controlled circuit may include, for example, a heat generating circuit (heater) made of metal wires shaped like bellows. On the other hand, the control means or device may include a control circuit (a microcomputer or the like) for controlling energization of the heating circuit (heater) serving as the controlled circuit.

In the above circuit with control function, preferably, the interruption detecting means or device is arranged to activate the self-diagnosis means or device only if the interruption of the predetermined pattern is detected within a predetermined initial period of time from the start of the energization from the commercial power supply.

The interruption detecting means or device of the present invention may include, for example, a means or device for operating the self-diagnosis means or device only if detecting three interruptions of the energization from the commercial power supply within one minute from the start of energization.

In any one of the above circuits with control function, preferably, the circuit to be controlled is a heater which can be fixed to a battery structure to heat the battery structure, the sensor is a temperature sensor for detecting ambient temperature corresponding to the predetermined environment; the control means or device is arranged to energize the heater only if the ambient temperature detected by the temperature sensor is within a specific temperature range corresponding to the specific condition, and the interruption detecting means or device is arranged to activate the self-diagnosis means or device when the interruption of the predetermined pattern is detected, irrespective of whether or not the ambient temperature is within the specific temperature range.

The battery structure may include, for example, a cell having a single power generating element housed in a battery case. It further includes a battery module provided with a battery case integrally formed with a plurality of compartments for individually housing power generating elements and the plurality of power generating elements housed in the compartments. It also includes a battery pack in which a plurality of cells or battery modules is connected in series or in parallel, which is held in a casing, a holder frame, or the like. Here, the "power generating element" is enclosed in a battery case to provide a battery function and includes positive electrode plates, negative electrode plate, separators, and an electrolyte, for example.

Further, in any one of the circuit with control function, preferably, the control means or device includes a current control means or device for changing a state of a current flowing from the commercial power supply at a predetermined timing according to a result of self diagnosis by the self-diagnosis means or device.

The current control means or device of the present invention may include, for example, a current control means or device arranged to change the level (an effective value) of current flowing from the commercial power supply by phase control (e.g. PWM control) for each type of abnormality occurring in the circuit with control function. In this case, an ammeter capable of measuring current in non-contact relation such as a clamp ammeter, an ammeter previously installed between the commercial power supply and the circuit with control function, or another type of ammeter can be used to detect the level of current flowing from the commercial power supply. Thus, the abnormality corresponding to the detected level of current can be specified.

The "state of current" to be changed by the current control means or device may include, for example, "waveform of current", "ON/OFF of current", and so on besides the "level of current (effective value)". They can be changed by adjusting for example a control value (a duty ratio) in the PWM control.

According to another aspect, the present invention provides a test method of a circuit with control function for testing whether or not the circuit with control function according to claim 1 is normally operated, the method comprising: a diagnosis instruction step of activating the self-diagnosis means or device in the circuit with control function by intermittently interrupting the energization from the commercial power supply in the predetermined pattern; and a detecting step of detecting a result of self diagnosis by the self-diagnosis means or device.

The test method according to the present invention for the circuit with control function includes the diagnosis instruction step of activating the self-diagnosis means or device by intermittently interrupting the energization from the commercial power supply in the predetermined pattern and the detecting step of detecting the result of the self diagnosis by the self-diagnosis means or device. Accordingly, simply by intermittently interrupting the energization from the commercial power supply in the predetermined pattern, it is possible to check whether or not the concerned circuit with control function is normally operated.

According to the test method of the present invention, as mentioned above, even though the circuit with control function subjected to the test is arranged to operate the controlled circuit only if the predetermined environment meets the specific condition, the concerned circuit with control function can be checked in any predetermined environment as to whether or not it is normally operated simply by intermittently interrupting the energization from the commercial power supply in the predetermined pattern. This can eliminate the need for a larger testing system to keep the environment of a test process (a test location) for the circuit with control function under the specific condition (e.g. ambient temperature of 0° or below) in which the controlled circuit is caused to operate. Testing cost can be decreased accordingly.

In the test method of the circuit with control function, preferably, the circuit with control function is a circuit with control function including current control means or device for changing a state of a current flowing from the commercial power supply at a predetermined timing according to a result of self diagnosis by the self-diagnosis means or device, and the detecting step is executed to detect the result of self diagnosis by detecting a state of current flowing from the commercial power supply to the circuit with control function.

If the circuit with control function to be tested is arranged to change the level of current flowing from the commercial power supply for each type of abnormality occurring in the circuit, the test method of the present invention may include, for example, a technique of detecting the level (a current value I(x) determined based on a diagnosis result, hereinafter referred to as a "diagnosis result current value") of current flowing from the commercial power supply by use of an ammeter capable of measuring current in noncontact relation such as a clamp ammeter and an ammeter previously installed between the commercial power supply and the circuit with control function. Specifically, it is detected whether or not any abnormality occurs based on the detected level of current and, if the abnormality is detected, the type of the abnormality can be specified.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of a preferred embodiment of a circuit with control function 10 embodying the present invention will now be given referring to the accompanying drawings.

Figure 1:
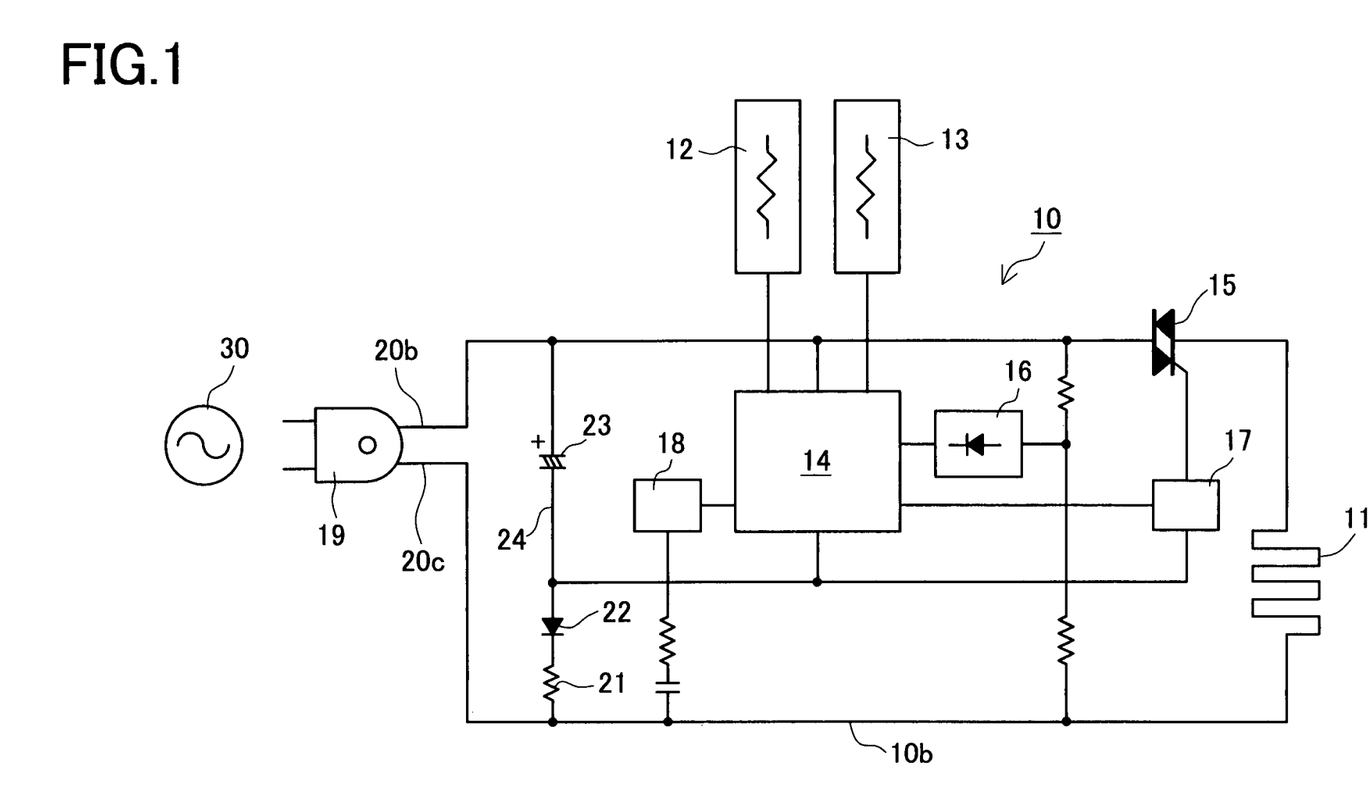
FIG. 1 is a circuit configuration diagram of a circuit with control function in a preferred embodiment.

The circuit with control function 10 includes, as shown in FIG. 1, a main circuit 10b in which a power plug 19 for connection to a commercial power supply 30 (hereinafter, simply referred to as a "power supply"), a heater 11 (a circuit to be controlled, which is also referred to as a "controlled circuit") capable of generating heat by energization from the power supply 30 (AC 100V), and a triac 15 for selectively allowing of energization (ON/OFF) to the heater 11 are connected in series. The circuit with control function 10 further includes a floating power circuit 24 connected in parallel to the main circuit 10b. The power circuit 24 includes a resistor 21, a diode 22, and an electrolytic capacitor 23.

The circuit with control function 10 is further provided with a microcomputer 14 (a control device, a control means) that can be operated by the floating power circuit 24 when the circuit 10 is connected to the power supply 30, a power supply voltage detector 16 for detecting voltage (power supply voltage) of the power supply 30, a triac driver 17 for controlling ON/OFF of the triac 15, and a zero crossing detector 18 for detecting a zero crossing of voltage of the power supply 30 (AC 100V). The microcomputer 14 is further connected to a first temperature sensor 12 for detecting ambient temperature (predetermined environment) and a second temperature sensor 13 for detecting the temperature of the heater 11.

The microcomputer 14 includes well known components such as CPU, ROM, and RAM, which are not shown. This microcomputer 14 is actuated by the floating power circuit 24 when the power plug 19 is plugged into the power supply 30, thereby executing internally-stored programs. To be specific, the microcomputer 14 controls such-that, only if the ambient temperature detected by the first temperature sensor 12 meets a specific condition, the triac 15 is turned ON to energize the heater 11. In the circuit with control function 10 of the present embodiment, the specific condition of ambient temperature at which the heater 11 is energized is set to be 0° or below. In other words, the heater 11 is energized only when the ambient temperature is 0° or below.

In the circuit with control function 10 of the present embodiment, even when the energization from the power supply 30 is temporarily interrupted, the microcomputer 14 is supplied with power from the electrolytic capacitor 23 and thus can continue the control.

The microcomputer 14 functions as a self-diagnosis means or device for diagnosing whether or not the circuit with control function 10 is normally operated. Specifically, it can self diagnose as to whether or not the first temperature sensor 12, second temperature sensor 13, zero crossing detector 18, heater 11, and others constituting the circuit with control function 10 are normally operated. The microcomputer 14 of the present embodiment is programmed such that, when three instant interruptions of energization (instant power interruptions) from the power supply 30 are detected by the power supply voltage detector 16 within one minute from the start of energization, it is regarded as a sign of external request for diagnosis, and the self-diagnosis process is started irrespective of whether or not the ambient temperature is 0° or below.

The circuit with control function 10 adjusts the level (effective value) of current flowing from the power supply 30 to the heater 11 by the phase control (e.g. PWM control) utilizing the triac 15, thereby controlling the heating temperature of the heater 11. For instance, when a control value (a duty ratio) in the PWM control is adjusted, the level (effective value) of current flowing from the power supply 30 to the heater 11 can be controlled. Thus, the duty ratio in the PWM control may be adjusted at predetermined timing to change the level of current flowing from the power supply 30.

By utilizing the above configuration, it is possible to inform of the type of abnormality occurring in the circuit with control function 10 to the outside. Specifically, after the self diagnosis, the circuit with control function 10 of the present embodiment can control the current flowing from the power supply 30 at the predetermined timing according to a result of the self diagnosis. To be more concrete, the level of inflowing current is preferably set in advance according to each type of abnormality. The type of abnormality occurring in the circuit with control function 10 can therefore be specified by detection of such level of inflowing current. The level of current flowing from the power supply 30 can be measured with for example a clamp ammeter 50 (see FIG. 6).

Figure 2:
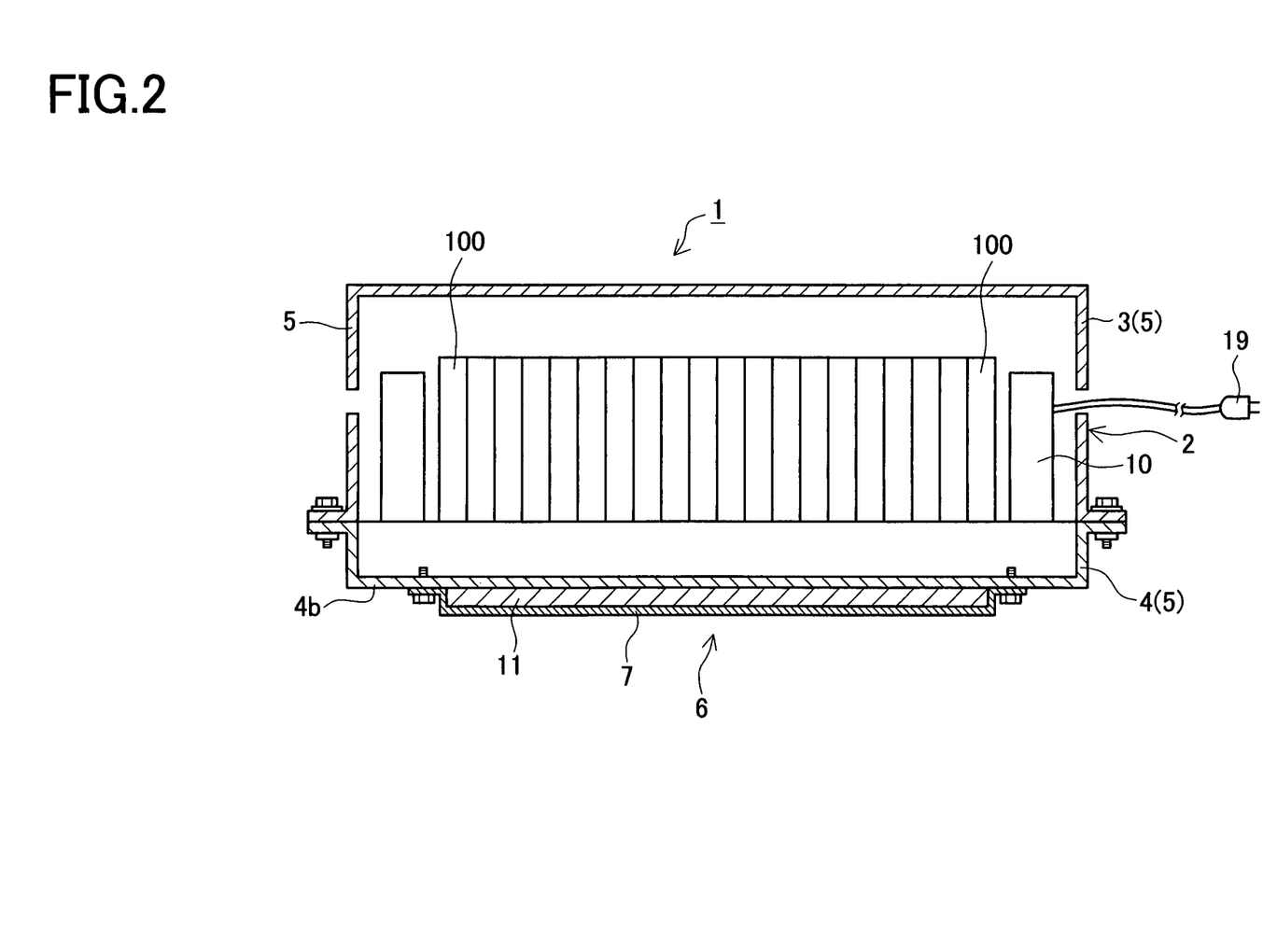
FIG. 2 is a partial cutaway view of a battery structure with heater in the embodiment.

The above configured circuit with control function 10 is installed in for example a battery pack 2 (a battery structure) that can serve as a power source of a hybrid electric vehicle, constituting a battery structure with heater 1, as shown in FIG. 2. The heater-equipped battery structure 1 includes the battery pack 2 and a heater unit 6 including the circuit with control function 10. The battery pack 2 includes a housing case 5 provided with a first housing member 3 and a second housing member 4 and a plurality of secondary batteries 100 arranged in the housing case 5. The heater unit 6 includes the circuit with control function 10 and a holder 7 holding the heater 11 of the circuit 10. The heater 11 is held in the holder 7 and fixed to a bottom wall 4b of the second housing member 4.

For instance, the power plug 19 is kept plugged in the power supply 30 while the hybrid electric vehicle with the battery structure with heater 1 is parked in a home garage. In this case, the battery pack 2 (i.e. the secondary batteries 100) can be heated by the heater 11 if the ambient temperature falls down to 0° or below. Even when the ambient temperature falls down to 0° or below, accordingly, each secondary battery 100 can be warmed in advance. Thus, the battery pack 2 can serves as the power source of the hybrid electric vehicle even at the start of the hybrid electric vehicle.

Here, details of the self-diagnosis of the circuit with control function 10 of the present embodiment and the test method of this circuit 10 will be explained below referring to the flowcharts of FIGS. 3 to 5.

Figure 3:
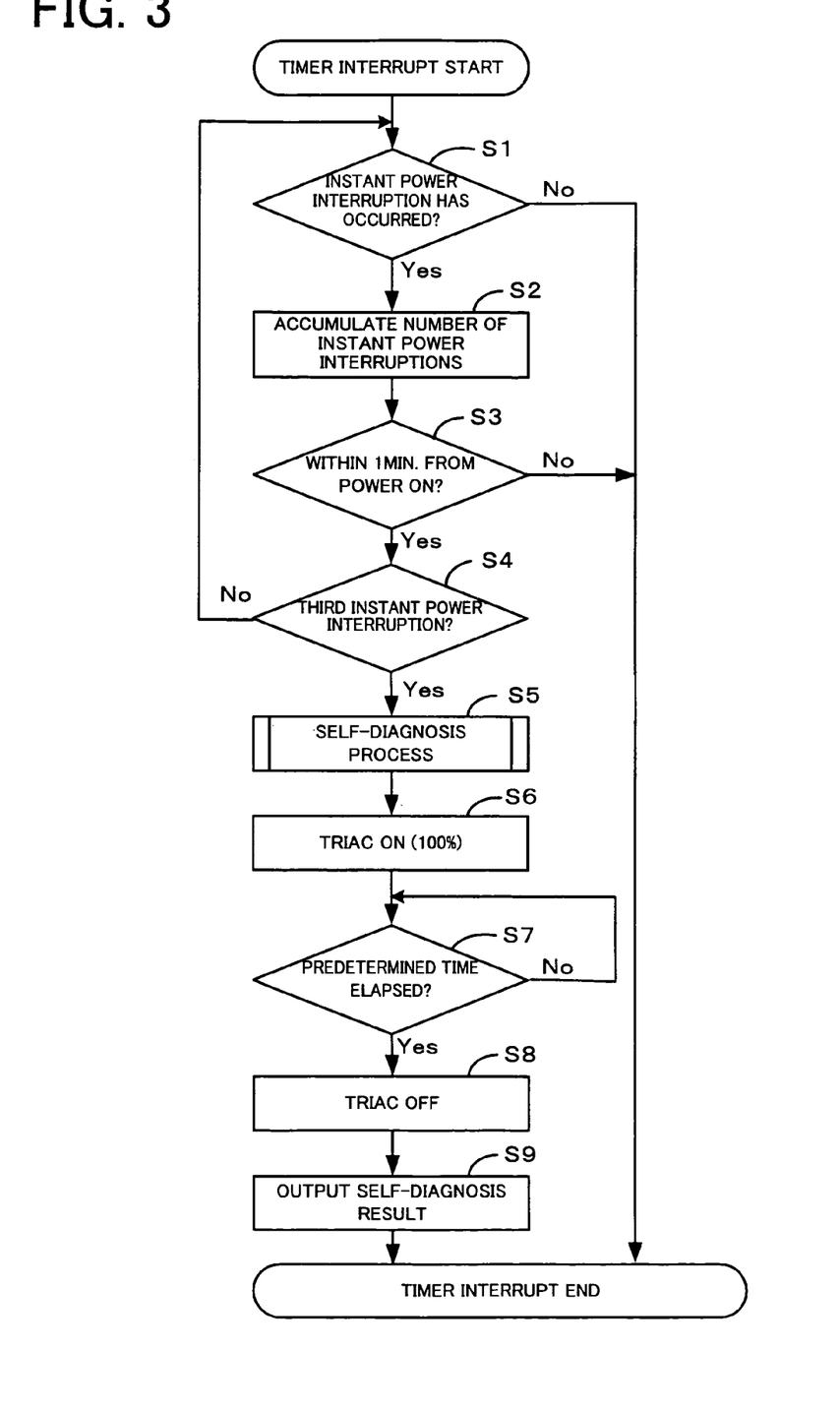
FIG. 3 is a flowchart of an interrupt handling in the circuit with control function.
Figure 4:
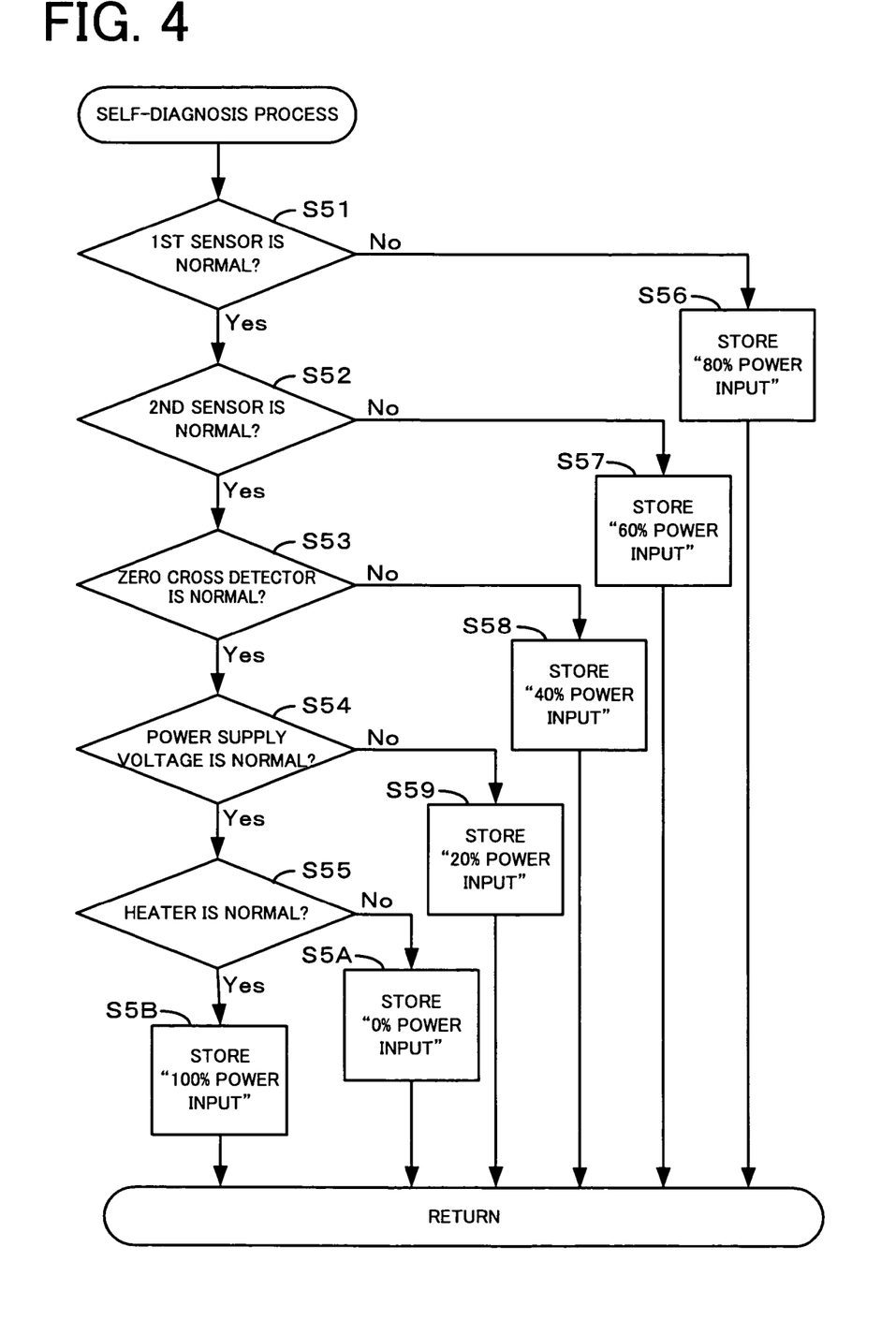
FIG. 4 is a flowchart of a self-diagnosis process in the circuit with control function.

In the circuit with control function 10, when a timer interrupt process is started at predetermined timing in a main routine process not shown executed by the microcomputer 14, as shown in FIG. 3, the flow starts at step S1 in which it is determined whether or not the energization from the power supply 30 has been instantly interrupted (instant power interruption). If it is determined that no instant power interruption has occurred (S1: NO), the timer interrupt process is terminated without executing the self-diagnosis process, and the flow returns to the main routine not shown. In the present embodiment, when a zero crossing input to the zero crossing detector 18 is temporarily stopped, it can be determined that the instant power interruption has occurred.

When it is determined that the instant power interruption has occurred (S1: YES), on the other hand, the flow goes to step S2 in which the number of instant power interruptions is accumulated. In S3, successively, it is determined whether or not an elapsed time from power-on (from the start of energization from the power supply 30) is within one minute. If it is determined that the elapsed time exceeds one minute from power-on (S3: NO), the timer interrupt process is terminated without executing the self-diagnosis process and the flow returns to the main routine not shown. If it is determined that the elapsed time is within one minute from the power-on (S3: YES), the flow goes to step S4 to determine whether or not it is a third instant power interruption. In other words, it is determined whether or not the number of instant power interruptions accumulated in previous S2 is three.

When it is decided in step S4 that the number of instant power interruptions is not three (S4: NO), the flow returns to step S1 and the aforementioned processes in steps S1 to S4 are repeated. On the other hand, when it is determined in step S4 that the number of instant power interruptions is three (S4: YES), the flow goes to step S5 to start the self-diagnosis process.

In the present embodiment, the processes in steps S1 to S4 correspond to an interruption detecting means or device.

Next, a sub-routine of the self-diagnosis process will be explained below in detail. As shown in FIG. 4, specifically, in step S51, it is first determined whether or not the first temperature sensor 12 is normal. In the case where the ambient temperature detected by the first temperature sensor 12 exceeds a range of possible temperatures in a use environment (e.g. 50° C. or higher), for example, the first temperature sensor 12 is determined to be not normal. When it is determined that the first temperature sensor 12 is not normal (S51: NO), the flow advances to step S56 in which it is programmed that the power input from the power supply 30 to the heater 11 is to be controlled to 80% in later S9, and then returns to the routine in FIG. 3. In other words, a program which will be executed in later S9 is stored to adjust the level (diagnosis result current value I(x)) of current flowing from the power supply 30 to the heater 11 based on the self-diagnosis result, by the phase control utilizing the triac 15, to 80% (I(x)=I(80%)) of a reference current value I(100%) of current flowing from the power supply 30 to the heater 11 without executing the phase control (set as "100% Input"). Thereafter, the flow returns to the routine in FIG. 3 and advances to step S6.

On the other hand, when the first temperature sensor 12 is judged as normal (S51: YES), the flow goes to step S52 in which it is determined whether or not the second temperature sensor 13 is normal. In the case where the heater temperature detected by the second temperature sensor 13 exceeds a range of possible temperatures of the heater 11, for example, the second temperature sensor 13 is determined to be not normal. When it is determined that the second temperature sensor 13 is not normal (S52: NO), the flow goes to step S57 in which it is programmed that the power input from the power supply 30 to the heater 11 is to be controlled to 60% in later S9, and then returns to the routine in FIG. 3. In other words, a program which will be executed in later S9 is stored to adjust the diagnosis result current value I(x), by the phase control utilizing the triac 15, to 60% (I(x)=I(60%)) of the reference current value I(100%), and then the flow returns to the routine in FIG. 3 and advances to step S6.

On the other hand, when the second temperature sensor 13 is judged as normal (S52: YES), the flow goes to step S53 in which it is determined whether or not the zero crossing detector 18 is normal. In the case where the duty ratio of pulses detected by the zero crossing detector 18 is within a range of 49% to 51%, for example, the zero crossing detector 18 is determined to be normal. When it is determined that the zero crossing detector 18 is not normal (S53: NO), the flow advances to step S58 in which it is programmed that the power input from the power supply 30 to the heater 11 is to be controlled to 40% in later S9, and the flow returns to the routine in FIG. 3. In other words, a program which will be executed in later S9 is stored to adjust the diagnosis result current value I(x), by the phase control utilizing the triac 15, to 40% (I(x)=I(40%)) of the reference current value I(100%), and then the flow returns to the routine in FIG. 3 and advances to step S6.

On the other hand, when the zero crossing detector 18 is judged as normal (S53: YES), the flow goes to step S54 in which it is determined whether or not power supply voltage is normal. Specifically, the circuit with control function 10 of the present embodiment is connected to the power supply 30 of AC 100V in actual use. If the power supply voltage detected by the power supply voltage detector 16 largely exceeds 125V, specifically, it is determined that the power supply voltage is not normal (S53: NO). When it is determined that the power supply voltage is not normal (S54: NO), the flow advances to step S59 in which it is programmed that the power input from the power supply 30 to the heater 11 is to be controlled to 20% in later S9, and the flow returns to the routine in FIG. 3. In other words, a program which will be executed in later S9 is stored to adjust the diagnosis result current value I(x) to 20% (I(x)=I(20%)) of the reference current value I(100%) by the phase control utilizing the triac 15, and then the flow returns to the routine in FIG. 3 and advancers to step S6.

On the other hand, when the power supply voltage is judged as normal (S54: YES), the flow goes to step S55 in which it is determined whether or not the heater 11 is normal. Specifically, if the heater 11 is broken, for example, it is determined that the heater 11 is not normal. When the heater 11 is determined to be not normal (S55: NO), the flow goes to step S5A in which it is programmed that the power input from the power supply 30 to the heater 11 is to be controlled to 0% in later S9, and the flow returns to the routine in FIG. 3. In other words, a program which will be executed in later S9 is stored to adjust the diagnosis result current value I(x) to 0% (I(x)=I(0%)) of the reference current value I(100%) by the phase control utilizing the triac 15, and then the flow returns to the routine in FIG. 3 and advancers to step S6. In the event the heater 11 is broken, the power input from the power supply 30 to the heater 11 is always 0%.

On the other hand, when the heater is judged as normal (S55: YES), the flow advances to step S5B in which it is programmed that the power input from the power supply 30 to the heater 11 is to be controlled to 100% in later S9, and the flow returns to the routine in FIG. 3. In other words, a program which will be executed in later S9 is stored to adjust the diagnosis result current value I(x) to 100% (I(x)=I(100%)) of the reference current value I(100%), and then the flow returns to the routine in FIG. 3.

In the present embodiment, the processes in step S5 (steps S51 to S5B) correspond to a self-diagnosis means or device.

Furthermore, the aforementioned relations between the current values flowing from the power supply 30 according the power input from the power supply 30 to the heater 11 and the self-diagnosis results are preferably prepared in the form of for example a test table (see Table 1) so that an operator who performs a test of the circuit with control function 10 can easily confirm. Accordingly, by measuring the reference current value I(100%) and the diagnosis result current value I(x), the operator who tests the circuit with control function 10 can find whether or not the circuit 10 is normal based on Table 1 as mentioned later. In the event some abnormality occurs in the circuit with control function 10, the type of such abnormality can be specified.

TABLE 1

| Rate of diagnosis result current value I(x) to reference current value I(100%) | Self-diagnosis result |
|---|---|
| 100% | No abnormality |
| 80% | $1^{st}$ temp. sensor is abnormal |
| 60% | $2^{nd}$ temp. sensor is abnormal |
| 40% | Zero crossing detector is abnormal |
| 20% | Power supply voltage is abnormal |
| 0% | Heater is abnormal |

Subsequently, the flow advances to step S6 in which the triac 15 is turned ON to control the power input from the power supply 30 to the heater 11 to 100%. At that time, a current of the reference current value I(100%) is allowed to flow from the power supply 30 to the heater 11. In S7, successively, it is determined whether or not a predetermined time has elapsed from the time at which the triac 15 is turned ON. When it is determined that the predetermined time has not elapsed yet (S7: NO), this process is repeated until the predetermined time has elapsed. When it is thereafter determined that the predetermined time has elapsed (S7: YES), the flow goes to step S8 in which the triac 15 is turned OFF to stop energization to the heater 11.

Subsequently, the flow advances to step S9 in which a self-diagnosis result is output. To be concrete, the current allowed to flow from the power supply 30 to the heater 11 is controlled so that the power input from the power supply 30 to the heater 11 is equal to the value stored in the previous steps S56 to S5B. For instance, in the case where the power input from the power supply 30 to the heater 11 is programmed to be 80% in step S56, the phase control (e.g. PWM control) is executed in step S9 by utilizing the triac 15 so that the level (diagnosis result current value I(x)) of current flowing from the power supply 30 to the heater 11 is 80% of the reference current value I(100%).

In the present embodiment, the triac 15 and the process in step S9 correspond to a current control means or device.

This circuit with control function 10 is tested in the following procedures.

Figure 5:
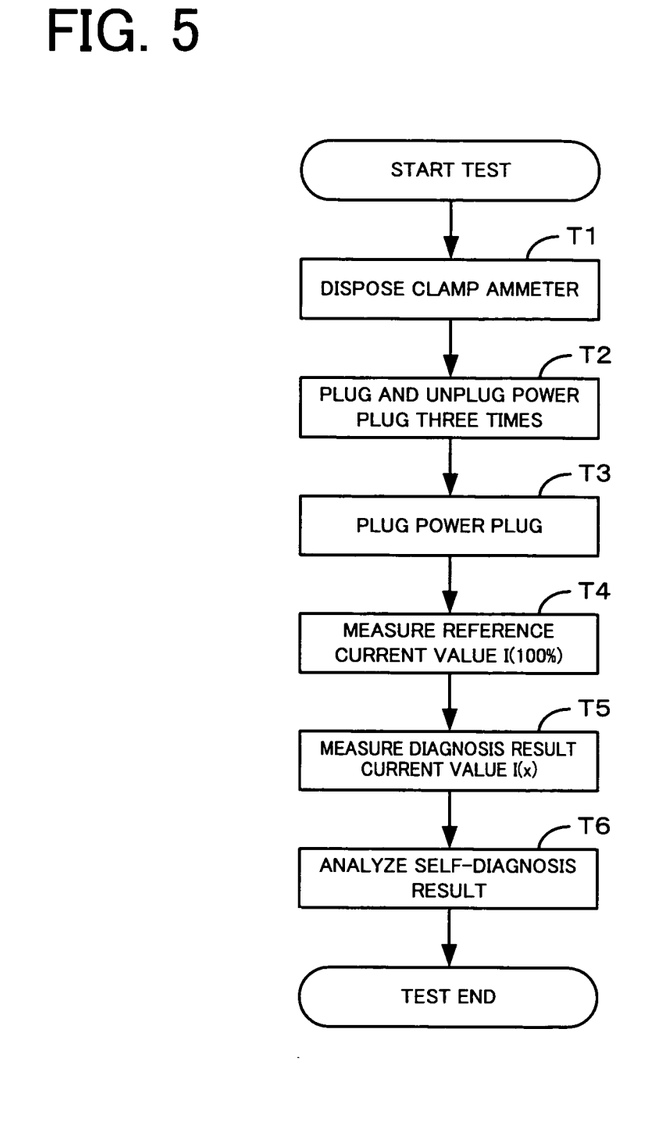
FIG. 5 is a flowchart of a test method of the circuit with control function.
Figure 6:
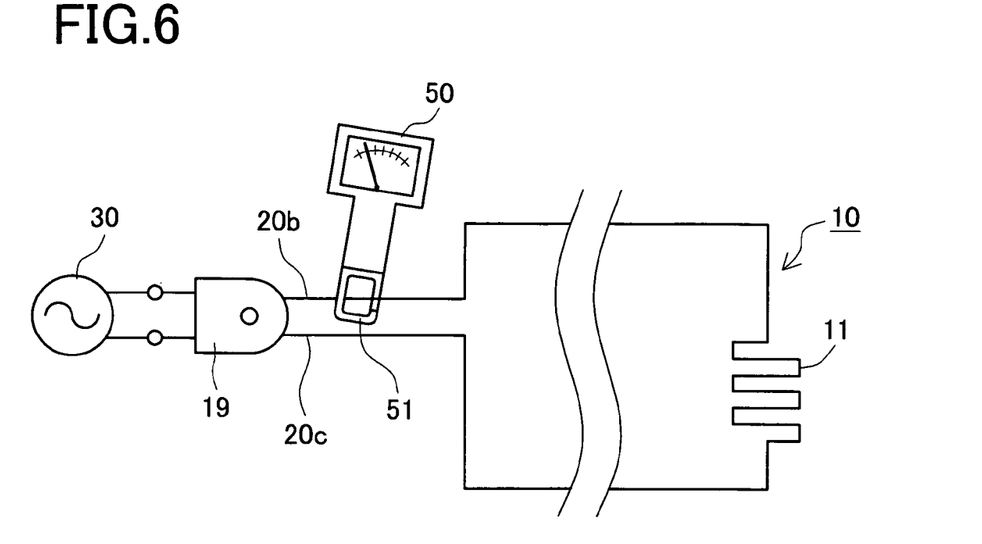
FIG. 6 is an explanatory diagram showing a technique of detecting a self-diagnosis result in the circuit with control function.

Firstly, the clamp ammeter 50 is coupled to the circuit with control function 10 in step T1 as shown in FIG. 5. For instance, the clamp ammeter 50 is attached to either one of a first conductive wire 20b and a second conductive wire 20c (in FIG. 6, attached to the first conductive wire 20b) connected to the power plug 19 as shown in FIG. 6. Specifically, the clamp ammeter 50 is disposed so that the first conductive wire 20b is inserted through the inside of a clamp part 51 of the ammeter 50.

In subsequent step T2, the operation of plugging and unplugging the power plug 19 with respect to the power supply 30 is repeated three times within one minute and the flow then goes to step T3 in which the power plug 19 is plugged in the power supply 30. As above, when the operation of plugging and unplugging the power plug with respect to the power supply 30 is repeated three times within one minute, every determination result in above steps S1 to S4 in the circuit with control function 10 is "YES". Accordingly, the flow goes to step S5 to instruct the start of self-diagnosis process of the circuit with control function 10.

In the present embodiment, the step T2 corresponds to a diagnosis instruction step.

In the circuit with control function 10, thereafter, the current of the reference current value I(100%) is allowed to flow from the power supply 30 to the heater 11 (see step S6) and thus the process advances to step T4 in which the test operator measures the reference current value I(100%) by the previously attached clamp ammeter 50. After a predetermined lapse of time, the current value of the current flowing from the power supply 30 to the heater 11 becomes zero (see step S8). Then, the current of the diagnosis result current value I(x) is caused to flow from the power supply 30 to the heater 11 (see step S9). At that time, the flow goes to step T5 in which the diagnosis result current value I(x) is measured by the clamp ammeter 50.

Successively, in step T6, the self-diagnosis result of the circuit with control function 10 is analyzed. To be specific, the measured reference current value I(100%) and the diagnosis result current value I(x) are compared to calculate a rate of the diagnosis result current value I(x) to the reference current value I(100%). Based on this calculated rate (%), it is determined from Table 1 as to whether or not the circuit with control function 10 is normal. In the event some abnormality occurs in the circuit with control function 10, the type of such abnormality can be specified. In the case where the rate of the diagnosis result current value I(x) to the reference current value I(100%) is about 80%, for example, it is determined that the first temperature sensor 12 is abnormal.

In the present embodiment, the steps T4 to T6 correspond to a detecting step.

As explained above, according to the test method of the circuit with control function 10 of the present embodiment, a technique of determining whether or not the circuit with control function 10 is normal can be achieved simply by repeating the operation of plugging and unplugging the power plug 19 with respect to the power supply 30 three times within one minute and then measuring the current value of current flowing from the power supply 30 by use of the clamp ammeter 50 or the like. If some abnormality occurs in the circuit with control function 10, the type of such abnormality can also be specified.

Even though the circuit with control function 10 of the present embodiment is a circuit with control function arranged to allow energization to the heater 11 only if the ambient temperature meets a specific condition, that is, 0° or below, the circuit with control function 10 can self-diagnose under any ambient temperature whether or not the circuit 10 is normally operated. The need for a larger testing system to keep an environment for a test process (a test location) for the circuit with control function 10 under the specific condition (e.g. ambient temperature of 0° or below) in which the heater 11 is caused to operate can be eliminated, leading to a decrease in testing cost.

The present invention has been explained referring to the above embodiment but is not limited thereto, and the present invention may be embodied in other specific forms without departing from the essential characteristics thereof.

Figure 7:
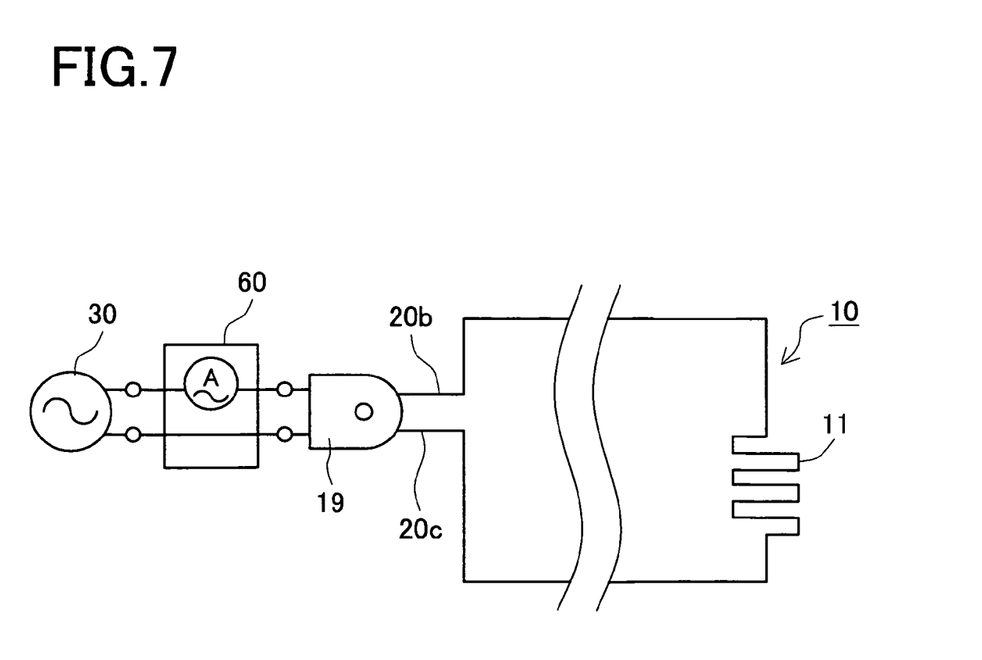
FIG. 7 is an explanatory diagram showing a technique of detecting a self-diagnosis result in the circuit with control function.

For instance, in the above embodiment, for detection of the self-diagnosis result of the circuit with control function 10, the clamp ammeter 50 is used to measure the level of current flowing from the power supply 30. However, the technique of measuring the level of current flowing from the power supply 30 is not limited to the above one. For example, as shown in FIG. 7, an ammeter 60 may be arranged in advance between the power supply 30 and the circuit with control function 10.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A circuit with control function comprising:
    a circuit to be controlled, the circuit being operated by a commercial power supply;
    a sensor for detecting a predetermined environment; and
    control means that is operated by the commercial power supply to control the circuit to be controlled, the control means being arranged to operate the circuit to be controlled if the predetermined environment detected by the sensor meets a specific condition,
    wherein the circuit to be controlled is a heater which can be fixed to a battery structure to heat the battery structure,
    the sensor is a temperature sensor for detecting ambient temperature corresponding to the predetermined environment,
    the control means is arranged to energize the heater if the ambient temperature detected by the temperature sensor is within a specific temperature range corresponding to the specific condition,
    wherein the control means includes:
    self-diagnosis means for diagnosing whether the circuit with control function is operating normally;
    interruption detecting means for detecting whether energization from the commercial power supply to the control means is interrupted in a predetermined pattern, the predetermined pattern comprising a specified number of interruptions of the energization from the commercial power supply to the control means in a specified period of time, the specified number being more than one, and the interruption detecting means being arranged to activate the self-diagnosis means when the interruption in the predetermined pattern is detected, irrespective of whether the ambient temperature is within the specific temperature range; and
    current control means for changing a state of a current flowing from the commercial power supply at a predetermined timing according to a result of self diagnosis by the self-diagnosis means, and
    the self-diagnosis means activates the circuit to be controlled by the commercial power supply, irrespective of whether the predetermined environment meets the specific condition, when the interruption detecting means detects the interruptions in the predetermined pattern, and
    the current control means is configured to change the level of current flowing from the commercial power supply for each type of abnormality occurring in the circuit with control function so that the type of abnormality occurring in the circuit with control function is informed to outside,
    wherein the circuit with control function further includes:
    a main circuit to which the heater and a triac for switching ON-OFF of energization to the heater are connected in series;
    a microcomputer serving as the control means;
    a power supply voltage detector for detecting voltage of the commercial power supply;
    a triac driver for controlling ON-OFF of the triac;
    a zero crossing detector for detecting a zero crossing of the commercial power supply;
    a first temperature sensor serving as the temperature sensor to detect the environment temperature; and
    a second temperature sensor to detect a temperature of the heater,
    the first temperature sensor and the second temperature sensor are connected to the microcomputer,
    the interruption detecting means is arranged to activate the self-diagnosis means when a zero crossing input to be detected by the zero crossing detector is stopped in a predetermined pattern,
    the self-diagnosis means is arranged to diagnose, as a type of abnormality occurring in the circuit with control function, whether at least an abnormality of the first temperature sensor, an abnormality of the second temperature sensor, an abnormality of the zero crossing detector, an abnormality of the voltage of the commercial power supply detected by the power supply voltage detector, and an abnormality of the heater are occurring,
    the current control means is arranged to change the level of current flowing from the commercial power supply by phase control utilizing the triac according to the type of abnormality, and
    the circuit with control function is arranged to specify the type of abnormality occurring in the circuit by detecting the level of current corresponding to the type of abnormality by an ammeter.

2. The circuit with control function according to claim 1, wherein
    the interruption detecting means is arranged to activate the self-diagnosis means only if the interruption of the predetermined pattern is detected within a predetermined initial period of time from the start of the energization from the commercial power supply.

3. The circuit with control function according to claim 1, wherein the specified number of interruptions is three, and the specified period of time is one minute.

4. A test method of a circuit with control function for testing whether a circuit with control function is operating normally, the circuit with the control function including a circuit to be controlled, the circuit being operated by a commercial power supply; a sensor for detecting a predetermined environment; and control means that is operated by the commercial power supply to control the circuit to be controlled, the control means being arranged to operate the circuit to be controlled if the predetermined environment detected by the sensor meets a specific condition, wherein the circuit to be controlled is a heater which can be fixed to a battery structure to heat the battery structure, the sensor is a temperature sensor for detecting ambient temperature corresponding to the predetermined environment, and the control means is arranged to energize the heater if the ambient temperature detected by the temperature sensor is within a specific temperature range corresponding to the specific condition, the control means including self-diagnosis means for diagnosing whether the circuit with control function is operating normally; interruption detecting means for detecting whether energization from the commercial power supply is interrupted in a predetermined pattern comprising a specific number of interruptions of the energization from the commercial power supply in a specified period of time, the specified number being more than one, the interruption detecting means being arranged to activate the self-diagnosis means when the interruption in the predetermined pattern is detected, irrespective of whether the ambient temperature is within the specific temperature range, and current control means for changing a state of a current flowing from the commercial power supply at a predetermined timing according to a result of self diagnosis by the self-diagnosis means, wherein the self-diagnosis means is arranged to activate the circuit to be controlled by the commercial power supply, irrespective of whether the predetermined environment meets the specific condition, when the interruptions are detected in the predetermined pattern, and wherein the current control means is configured to change the level of current flowing from the commercial power supply for each type of abnormality occurring in the circuit with control function so that the type of abnormality occurring in the circuit with control function is informed to outside, wherein the circuit with control function further includes: a main circuit to which the heater and a triac for switching ON-OFF of energization to the heater are connected in a series; a microcomputer serving as the control means; a power supply voltage detector for detecting voltage of the commercial power supply; a triac driver for controlling ON-OFF of the triac; a zero crossing detector for detecting a zero crossing of voltage of the commercial power supply; a first temperature sensor connected to the microcomputer to serve as the temperature sensor for detecting the environment temperature; and a second temperature sensor connected to the microcomputer to detect a temperature of the heater, the interruption detecting means is arranged to activate the self-diagnosis means when a zero crossing input to be detected by the zero crossing detector is stopped in the predetermined pattern, the self-diagnosis means is arranged to diagnose, as a type of abnormality occurring in the circuit with control function, whether at least an abnormality of the first temperature sensor, an abnormality of the second temperature sensor, an abnormality of the zero crossing detector, an abnormality of the voltage of the commercial power supply detected by the power supply voltage detector, and an abnormality of the heater are occurring, the current control means is arranged to change the level of current flowing from the commercial power supply by phase control utilizing the triac according to the type of abnormality, the test method includes;

a diagnosis instruction step of instructing activation of the self-diagnosis means in the circuit with control function by intentionally intermittently interrupting the energization from the commercial power supply in the predetermined pattern comprising two or more interruptions of the energization from the commercial power supply to the control means in the specified period of time, and then starting the energization from the commercial power supply, irrespective of whether the predetermined environment temperature is within the specific temperature range;

a detecting step of detecting the interruption of energization from the commercial power supply in the predetermined pattern by detecting that the zero crossing input detected in the zero crossing detector is stopped in the predetermined pattern by the interruption detecting means when the diagnosis instruction step is executed;

a step of activating the self-diagnosis means by the interruption detecting means after the interruption in the predetermined pattern is detected, irrespective of whether the environment temperature is within the specific temperature range;

a diagnosis step of diagnosing whether at least the abnormality of the first temperature sensor, the abnormality of the second temperature sensor, the abnormality of the zero crossing detector, the abnormality of voltage of the commercial power supply detected by the power supply voltage detector, and the abnormality of the heater by the self-diagnosis means;

a step of informing the type of abnormality to outside by changing the level of current flowing from the commercial power supply by phase control utilizing the triac according to the type of abnormality, and a detecting step of detecting a result of self diagnosis obtained by the self-diagnosis means and specifying the type of abnormality occurring in the circuit with control function by detecting the level of current corresponding to the type of abnormality by an ammeter.

5. The test method of a circuit with control function, according to claim 4, wherein the specified number of interruptions is three, and the specified period of time is one minute.

6. A circuit with control function comprising:
a circuit to be controlled, the circuit being operated by a commercial power supply;
a sensor for detecting a predetermined environment; and
a control device that is operated by the commercial power supply to control the circuit to be controlled, the control device being arranged to operate the circuit to be controlled if the predetermined environment detected by the sensor meets a specific condition,
wherein the circuit to be controlled is a heater which can be fixed to a battery structure to heat the battery structure,
the sensor is a temperature sensor for detecting ambient temperature corresponding to the predetermined environment,
the control device is arranged to energize the heater if the ambient temperature detected by the temperature sensor is within a specific temperature range corresponding to the specific condition,
wherein the control device includes:
a self-diagnosis device for diagnosing whether the circuit with control function is operating normally;
an interruption detecting device for detecting whether energization from the commercial power supply to the control device is interrupted in a predetermined pattern, the predetermined pattern comprising a specified number of interruptions of the energization from the commercial power supply to the control device in a specified period of time, the specified number being more than one, and the interruption detecting device being arranged to activate the self-diagnosis device when the interruption in the predetermined pattern is detected, irrespective of whether the ambient temperature is within the specific temperature range; and a current control device for changing a state of a current flowing from the commercial power supply at a predetermined timing according to a result of self diagnosis by the self-diagnosis device, and the self-diagnosis device activates the circuit to be controlled by the commercial power supply, irrespective of whether the predetermined environment meets the specific condition, when the interruption detecting device detects the interruptions in the predetermined pattern, and the current control device is configured to change the level of current flowing from the commercial power supply for each type of abnormality occurring in the circuit with control function so that the type of abnormality occurring in the circuit with control function is informed to outside, wherein the circuit with control function further includes:
a main circuit to which the heater and a triac for switching ON-OFF of energization to the heater are connected in series;
a microcomputer serving as the control means;
a power supply voltage detector for detecting voltage of the commercial power supply;
a triac driver for controlling ON-OFF of the triac;
a zero crossing detector for detecting a zero crossing of the commercial power supply;
a first temperature sensor serving as the temperature sensor to detect the environment temperature; and
a second temperature sensor to detect a temperature of the heater,
the first temperature sensor and the second temperature sensor are connected to the microcomputer,
the interruption detecting means is arranged to activate the self-diagnosis means when a zero crossing input to be detected by the zero crossing detector is stopped in a predetermined pattern,
the self-diagnosis means is arranged to diagnose, as a type of abnormality occurring in the circuit with control function, whether at least an abnormality of the first temperature sensor, an abnormality of the second temperature sensor, an abnormality of the zero crossing detector, an abnormality of the voltage of the commercial power supply detected by the power supply voltage detector, and an abnormality of the heater are occurring,
the current control means is arranged to change the level of current flowing from the commercial power supply by phase control utilizing the triac according to the type of abnormality, and
the circuit with control function is arranged to specify the type of abnormality occurring in the circuit by detecting the level of current corresponding to the type of abnormality by an ammeter.

7. The circuit with control function according to claim 6, wherein
the interruption detecting device is arranged to activate the self-diagnosis device only if the interruption of the predetermined pattern is detected within a predetermined initial period of time from the start of the energization from the commercial power supply.

8. The circuit with control function according to claim 6, wherein the specified number of interruptions is three, and the specified period of time is one minute.

9. A test method of a circuit with control function for testing whether a circuit with control function is operating normally, the circuit with the control function including a circuit to be controlled, the circuit being operated by a commercial power supply; a sensor for detecting a predetermined environment; and a control device that is operated by the commercial power supply to control the circuit to be controlled, the control device being arranged to operate the circuit to be controlled if the predetermined environment detected by the sensor meets a specific condition, wherein the circuit to be controlled is a heater which can be fixed to a battery structure to heat the battery structure, the sensor is a temperature sensor for detecting ambient temperature corresponding to the predetermined environment, and the control device is arranged to energize the heater if the ambient temperature detected by the temperature sensor is within a specific temperature range corresponding to the specific condition, wherein the control device includes a self-diagnosis device for diagnosing whether the circuit with control function is operating normally; an interruption detecting device for detecting whether energization from the commercial power supply is interrupted in a predetermined pattern comprising a specific number of interruptions of the energization from the commercial power supply in a specified period of time, the specified number being more than one, the interruption detecting device being arranged to activate the self-diagnosis device when the interruption in the predetermined pattern is detected, irrespective of whether the ambient temperature is within the specific temperature range, and a current control device for changing a state of a current flowing from the commercial power supply at a predetermined timing according to a result of self diagnosis by the self-diagnosis device, wherein the self-diagnosis means is arranged to activate the circuit to be controlled by the commercial power supply, irrespective of whether the predetermined environment meets the specific condition, when the interruptions are detected in the predetermined pattern, and wherein the current control device is configured to change the level of current flowing from the commercial power supply for each type of abnormality occurring in the circuit with control function so that the type of abnormality occurring in the circuit with control function is informed to outside, wherein the circuit with control function further includes:
a main circuit to which the heater and a triac for switching ON-OFF of energization to the heater are connected in a series; a microcomputer serving as the control means; a power supply voltage detector for detecting voltage of the commercial power supply; a triac driver for controlling ON-OFF of the triac; a zero crossing detector for detecting a zero crossing of voltage of the commercial power supply; a first temperature sensor connected to the microcomputer to serve as the temperature sensor for detecting the environment temperature; and a second temperature sensor connected to the microcomputer to detect a temperature of the heater, the interruption detecting means is arranged to activate the self-diagnosis means when a zero crossing input to be detected by the zero crossing detector is stopped in the predetermined pattern, the self-diagnosis means is arranged to diagnose, as a type of abnormality occurring in the circuit with control function, whether at least an abnormality of the first temperature sensor, an abnormality of the second temperature sensor, an abnormality of the zero crossing detector, an abnormality of the voltage of the commercial power supply detected by the power supply voltage detector, and an abnormality of the heater are occurring, the current control means is arranged to change the level of current flowing from the commercial power supply by phase control utilizing the triac according to the type of abnormality, the test method includes;

a diagnosis instruction step of instructing activation of the self-diagnosis means in the circuit with control function by intentionally intermittently interrupting the energization from the commercial power supply in the predetermined pattern comprising two or more interruptions of the energization from the commercial power supply to the control means in the specified period of time, and then starting the energization from the commercial power supply, irrespective of whether the predetermined environment temperature is within the specific temperature range;

a detecting step of detecting the interruption of energization from the commercial power supply in the predetermined pattern by detecting that the zero crossing input detected in the zero crossing detector is stopped in the predetermined pattern by the interruption detecting means when the diagnosis instruction step is executed;

a step of activating the self-diagnosis means by the interruption detecting means after the interruption in the predetermined pattern is detected, irrespective of whether the environment temperature is within the specific temperature range;

a diagnosis step of diagnosing whether at least the abnormality of the first temperature sensor, the abnormality of the second temperature sensor, the abnormality of the zero crossing detector, the abnormality of voltage of the commercial power supply detected by the power supply voltage detector, and the abnormality of the heater by the self-diagnosis means;

a step of informing the type of abnormality to outside by changing the level of current flowing from the commercial power supply by phase control utilizing the triac according to the type of abnormality, and a detecting step of detecting a result of self diagnosis obtained by the self-diagnosis means and specifying the type of abnormality occurring in the circuit with control function by detecting the level of current corresponding to the type of abnormality by an ammeter.

10. The test method of a circuit with control function, according to claim 9, wherein the specified number of interruptions is three, and the specified period of time is one minute.

* * * * *